United States Patent
Iwakawa et al.

(10) Patent No.: US 11,835,824 B2
(45) Date of Patent: Dec. 5, 2023

(54) LIQUID CRYSTAL DISPLAY DEVICE AND PRODUCTION METHOD FOR LIQUID CRYSTAL DISPLAY DEVICE

(71) Applicant: Trivale Technologies, Santa Clara, CA (US)

(72) Inventors: Manabu Iwakawa, Tokyo (JP); Takanori Okumura, Tokyo (JP); Hiroshi Umeda, Tokyo (JP); Eri Kurihara, Tokyo (JP); Yuki Soma, Kumamoto (JP)

(73) Assignee: Trivale Technologies, Santa Clara, CA (US)

( * ) Notice: Subject to any disclaimer, the term of this patent is extended or adjusted under 35 U.S.C. 154(b) by 66 days.

(21) Appl. No.: 17/597,296

(22) PCT Filed: Jul. 4, 2019

(86) PCT No.: PCT/JP2019/026588
§ 371 (c)(1),
(2) Date: Dec. 30, 2021

(87) PCT Pub. No.: WO2021/001983
PCT Pub. Date: Jan. 7, 2021

(65) Prior Publication Data
US 2022/0317487 A1   Oct. 6, 2022

(51) Int. Cl.
*G02F 1/1339* (2006.01)
*G02F 1/1333* (2006.01)

(52) U.S. Cl.
CPC ...... *G02F 1/1339* (2013.01); *G02F 1/133351* (2013.01)

(58) Field of Classification Search
CPC .................. G02F 1/133351; G02F 1/1339
(Continued)

(56) References Cited

U.S. PATENT DOCUMENTS 6,542,215 B2 * 4/2003 Lee ............... G02F 1/1339
349/190
6,567,147 B1 * 5/2003 Hirakata ......... G02F 1/1339
349/190
(Continued)

FOREIGN PATENT DOCUMENTS

CN    112631016 A * 4/2021 ....... G02F 1/133514
JP    2000-193989 A    7/2000
(Continued)

OTHER PUBLICATIONS

International Search Report issued in PCT/JP2019/026588; dated Aug. 13, 2019.
(Continued)

*Primary Examiner* — Christopher M Raabe
(74) *Attorney, Agent, or Firm* — Studebaker & Brackett PC

(57) ABSTRACT

The purpose of the present invention is to provide a configuration that allows the corners of a sealing material to be appropriately cut. The liquid crystal display device is provided with a liquid crystal panel that includes: an annular sealing material that has a corner in plan view and is for sealing a liquid crystal layer between a first transparent substrate and a second transparent substrate; and a first panel cutting aid material that is embedded in the corner of the sealing material. The first panel cutting aid material has a height that matches the gap between the first transparent substrate and the second transparent substrate. The first panel cutting aid material has a surface that is exposed from the outer periphery of the sealing material.

11 Claims, 13 Drawing Sheets

(58) Field of Classification Search
USPC .......................................................... 349/153
See application file for complete search history.

(56) References Cited

U.S. PATENT DOCUMENTS

| | | | | |
|---|---|---|---|---|
| 6,573,972 B2* | 6/2003 | Sasaki | .................... | G02F 1/1339 |
| | | | | 349/154 |
| 2005/0040762 A1* | 2/2005 | Kurihara | ............ | H10K 50/8445 |
| | | | | 313/504 |
| 2007/0195255 A1* | 8/2007 | Cho | ........................ | G02F 1/1339 |
| | | | | 349/153 |
| 2012/0026449 A1* | 2/2012 | Yang | ................. | G02F 1/133512 |
| | | | | 349/153 |
| 2013/0256714 A1* | 10/2013 | Nishi | ...................... | H10K 71/50 |
| | | | | 257/88 |
| 2020/0233257 A1* | 7/2020 | Taniike | ................. | G02F 1/1333 |
| 2020/0292862 A1* | 9/2020 | Xu | .................... | G02F 1/133351 |
| 2021/0399254 A1* | 12/2021 | Ahn | ................... | H10K 50/8428 |

FOREIGN PATENT DOCUMENTS

| | | | |
|---|---|---|---|
| JP | 2006-030792 A | 2/2006 | |
| JP | 2008-151969 A | 7/2008 | |
| JP | 2014-052569 A | 3/2014 | |

OTHER PUBLICATIONS

International Preliminary Report On Patentability (Chapter I) and Written Opinion of the International Searching Authority issued in PCT/JP2019/026588; dated Dec. 28, 2021.

\* cited by examiner

LIQUID CRYSTAL DISPLAY DEVICE AND PRODUCTION METHOD FOR LIQUID CRYSTAL DISPLAY DEVICE

TECHNICAL FIELD

The present invention relates to a liquid crystal display device and a production method for a liquid crystal display device.

BACKGROUND ART

Liquid crystal display devices are widely used in display devices of televisions, personal computers, smartphones and the like, display devices for vehicle-mounted applications, and display devices for amusement, for example. In recent years there has been a tendency to emphasize ease of design and design properties, in addition to improvements in the performance of display characteristics, and the demand for narrow frames for liquid crystal display devices is increasing.

Patent literature article 1, for example, discloses a technology relating to narrowing of the frame of a liquid crystal display device by narrowing the edges, in a plan view, of a sealing material for sealing the liquid crystal, other than the edges in the vicinity of terminals for external connection. Further, patent literature article 1 also discloses a production method for narrowing the frame by cutting along a cutting line on the sealing material.

PRIOR ART LITERATURE

Patent Literature

Patent literature article 1: Japanese Unexamined Patent Publication 2008-151969

SUMMARY OF THE INVENTION

Problems to be Resolved by the Invention

However, technology such as that in patent literature article 1 requires cutting not only of the edges of the sealing material that have a linear shape, but also of corner portions having arc shapes or the like. Since stress imbalances arise when such corner portion cutting is performed, there are problems in that cracking and chipping occur in edge portions of the liquid crystal panel, and cutting failure, in which cutting deviates from the desired cutting line, occurs.

Accordingly, the present invention has been made in view of such problems, and the objective thereof is to provide a technology enabling the corner portions of a sealing material to be cut appropriately.

Means of Overcoming the Problems

A liquid crystal display device according to the present invention is provided with a liquid crystal panel including a first transparent substrate and a second transparent substrate, a liquid crystal layer sandwiched between the first transparent substrate and the second transparent substrate, an annular sealing material which has a corner portion in a plan view, and which seals the liquid crystal layer between the first transparent substrate and the second transparent substrate, and a first panel cutting aid member embedded in the corner portion of the sealing material, wherein: a part of the sealing material exhibiting a linear shape, excluding the corner portion, has a surface which is exposed in an outermost peripheral portion of the liquid crystal panel; the first panel cutting aid member has the same height as a gap between the first transparent substrate and the second transparent substrate; the first panel cutting aid member is in contact with the sealing material; and the first panel cutting aid member has a surface which is exposed from an outer peripheral portion of the sealing material.

Advantages of the Invention

According to the present invention, the first panel cutting aid member is embedded in the corner portion of the sealing material, has the same height as the gap between the first transparent substrate and the second transparent substrate, and has a surface exposed from the outer peripheral portion of the sealing material. By adopting such a configuration, the corner portion of the sealing material can be cut appropriately.

The aims, features, aspects, and advantages of the present invention will become clearer through the following detailed description and the accompanying drawings.

Modes of Embodying the Invention

The configuration of a liquid crystal panel of a liquid crystal display device according to an embodiment of the present invention will now be described with reference to the drawings. It should be noted that the drawings are schematic, and are used to describe functions and structures conceptually.

Further, the present invention is not limited by the following embodiments. Unless otherwise specified, the basic configuration of the liquid crystal panel of the liquid crystal display device is common to all the embodiments. Further, components denoted using the same reference signs are identical or corresponding components, and this is common throughout the entire text of the specification.

Embodiment 1

Figure 1:
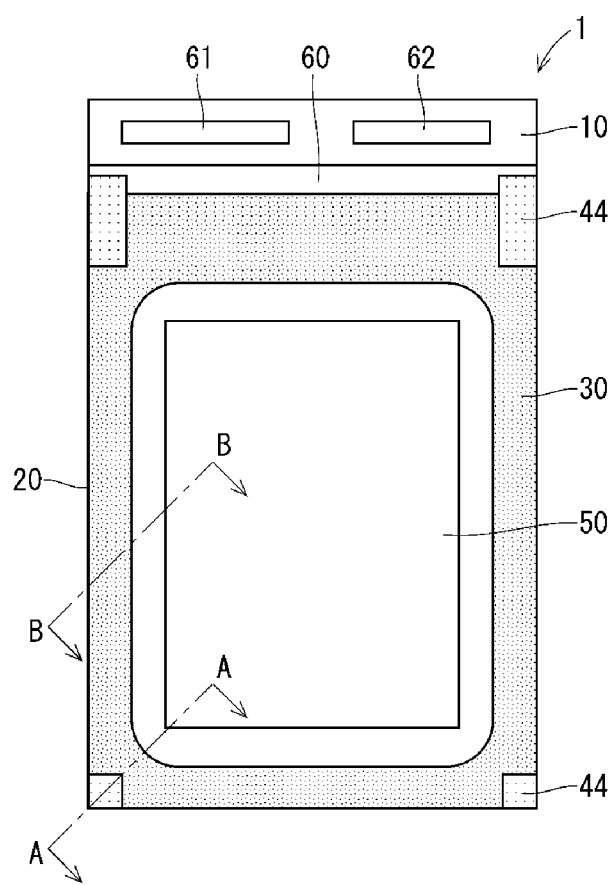
FIG. 1 is a schematic plan view illustrating the configuration of a liquid crystal panel 1 of a liquid crystal display device according to embodiment 1.
Figure 2:
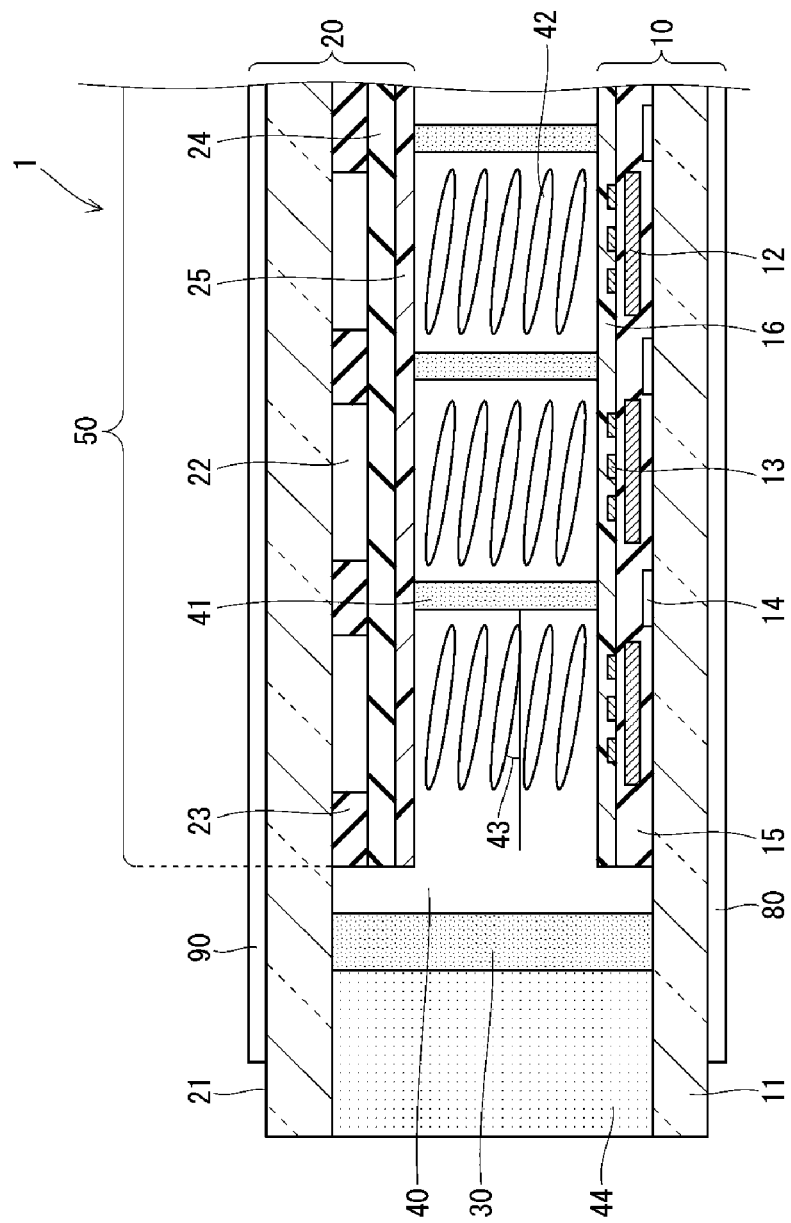
FIG. 2 is a schematic cross sectional view illustrating the configuration of the liquid crystal panel 1 of the liquid crystal display device according to embodiment 1, as seen along the cutting plane line A-A in FIG. 1.
Figure 3:
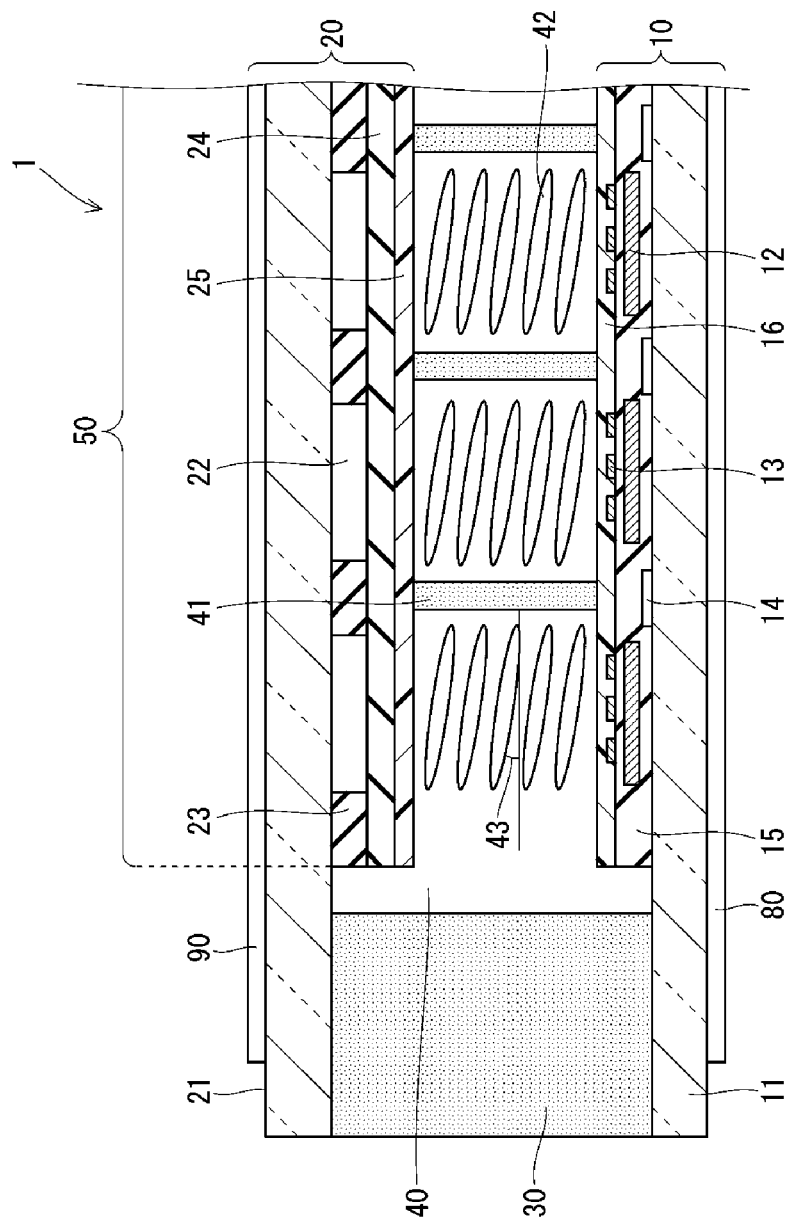
FIG. 3 is a schematic cross sectional view illustrating the configuration of the liquid crystal panel 1 of the liquid crystal display device according to embodiment 1, as seen along the cutting plane line B-B in FIG. 1.

FIG. 1 is a schematic plan view illustrating the configuration of a liquid crystal panel 1 provided in a liquid crystal display device according to embodiment 1 of the present invention. FIG. 2 is a schematic cross sectional view illustrating the configuration of the liquid crystal panel 1 in FIG. 1, as seen along the cutting plane line A-A in FIG. 1. FIG. 3 is a schematic cross sectional view illustrating the configuration of the liquid crystal panel 1 in FIG. 1, as seen along the cutting plane line B-B in FIG. 1. FIG. 1, FIG. 2, and FIG. 3 illustrate, by way of example, a transverse electric field type liquid crystal panel 1 in which Thin Film Transistors (abbreviated to TFT) serve as switching elements. Hereinafter, the liquid crystal panel 1 is described as an IPS (registered trademark) (In Plane Switching) type or an FFS (Fringe Field Switching) type liquid crystal panel, but the liquid crystal panel is not limited thereto and may, for example, be a TN (Twisted Nematic) type liquid crystal panel.

As illustrated in FIG. 1, FIG. 2 and FIG. 3, the liquid crystal panel 1 is provided with a TFT array substrate 10 (referred to as array substrate hereinbelow), a color filter substrate 20, a sealing material 30, a liquid crystal layer 40, and a first panel cutting aid member 44. It should be noted that in the plan view in FIG. 1, the sealing material 30 and the first panel cutting aid members 44 are positioned on the rear side of the color filter substrate 20, and should thus be illustrated using hidden lines (dashed lines), but for convenience are illustrated as solid lines in the plan views from FIG. 1.

The array substrate 10 is provided, for example, with a transparent substrate 11, which is a first transparent substrate comprising a glass substrate. As illustrated in FIG. 1, the region of the array substrate 10 as seen in a plan view is broadly divided by means of the sealing material 30 into a display region 50 in which TFTs 14 are arranged in a matrix, and a frame region 60 provided in such a way as to surround the display region 50.

In the display region 50, the color filter substrate 20 is disposed in a position a prescribed distance away from the array substrate 10, in such a way as to face the array substrate 10. The color filter substrate 20 is provided, for example, with a transparent substrate 21, which is a second transparent substrate comprising a glass substrate.

The liquid crystal layer 40 is sandwiched between the array substrate 10 and the color filter substrate 20. When seen in a plan view, the annular sealing material 30 includes linear portions and corner portions connecting the linear portions to one another, and is disposed in such a way as to surround a region corresponding to the display region 50. The sealing material 30 configured in this way hermetically seals a space between the array substrate 10 and the color filter substrate 20, to seal the liquid crystal layer 40 between said substrates.

The first panel cutting aid members 44 are embedded in the corner portions of the sealing material and are in contact with the sealing material 30. Further, the first panel cutting aid members 44 have a surface which is exposed from an outer peripheral portion of the annular sealing material 30. By adopting such first panel cutting aid members 44, the width of only the sealing material 30 in the corner portions is less than the width of the sealing material 30 in the parts other than the corner portions. Furthermore, the total width of the sealing material 30 and the first panel cutting aid members 44 in the corner portions is greater than the width of the sealing material 30 in the parts other than the corner portions.

In embodiment 1, the first panel cutting aid members 44 extend from the trajectory of the sealing material 30 to the outside of the sealing material 30. Here, the trajectory of the sealing material 30 means a region in which the sealing material is disposed in a typical liquid crystal panel. Furthermore, one edge of the sealing material 30, extending in the short-side direction or the long-side direction of the liquid crystal panel 1, and each of the first panel cutting aid members 44, are disposed in such a way as to be in contact with one another. It should be noted that the first panel cutting aid members 44 may extend to the side of the sealing material 30 opposite to the liquid crystal layer 40, in other words to the outside of the sealing material 30, or may extend beyond the outside of the sealing material 30.

As illustrated in FIG. 2, the first panel cutting aid members 44 are disposed in such a way as to fill the space between the array substrate 10 and the color filter substrate 20 in the corner portions, and have the same height as the gap between the transparent substrate 11 and the transparent substrate 21, in other words the cell gap of the liquid crystal panel 1.

As illustrated in FIG. 3, since the first panel cutting aid members 44 are not disposed in the parts of the sealing material 30 in FIG. 1 that exhibit a linear shape, other than the corner portions, said parts have a surface that is exposed in the outermost peripheral portion of the liquid crystal panel 1. As illustrated in FIG. 1, the surface in which sealing material 30 is exposed and the surface in which the first panel cutting aid members 44 are exposed are flush with one another, without a step.

The first panel cutting aid members 44 are formed using a photosensitive resin, for example. Multiple columnar spacers 41 are disposed in the display region 50 between the array substrate 10 and the color filter substrate 20. The columnar spacers 41 hold the array substrate 10 and the color filter substrate 20, while forming a gap having a fixed separation between said substrates.

On the surface side of the transparent substrate that faces the color filter substrate 20 in the display region 50 of the array substrate 10, gate electrodes and source electrodes, which are not shown in the drawings, are arranged respectively in a row direction and a column direction, and common electrodes 12, pixel electrodes 13, and TFTs 14 are arranged in a matrix.

The TFTs 14, which are switching elements, are connected to the pixel electrodes 13 in such a way as to be capable of appropriately applying a voltage to the pixel electrodes 13. The TFTs 14 and the flat-plate shaped common electrodes 12 are covered by an insulating film 15. The pixel electrodes 13, which have a pattern in which a plurality of slit-shaped opening portions are formed parallel to one another, are disposed on the common electrodes 12 with the insulating film 15 interposed therebetween. An alignment film 16 for aligning the liquid crystal in the liquid crystal layer 40 is provided on the insulating film 15 in such a way as to cover the pixel electrodes 13.

Further, an array substrate side polarizing plate is disposed on the surface of the transparent substrate 11 on the opposite side to the surface on which the common electrodes 12, the pixel electrodes 13, and the TFTs 14 are disposed, in the display region 50.

It should be noted that it is not essential for the array substrate 10 to have the abovementioned configuration. For example, with regard to the common electrodes 12 and the pixel electrodes 13, the respective shapes and the vertical relationship between the positions thereof may be reversed. In other words, common electrodes 12 having a pattern in which a plurality of slit-shaped opening portions are formed parallel to one another may be disposed above the pixel electrodes 13, and flat-plate shaped pixel electrodes may be disposed below the common electrodes 12. Furthermore, the TFTs 14 may be connected to the common electrodes 12 in such a way as to be capable of appropriately applying a voltage to the common electrodes 12.

As discussed hereinabove, the color filter substrate 20 is provided with the transparent substrate 21. Color filters 22, which are colored material layers, and light shielding layers 23 are disposed on the surface side of the transparent substrate 21 that faces the array substrate 10. The light shielding layers 23 shield light between the color filters 22, and shield light in the frame region 60 disposed outside the region corresponding to the display region 50. It should be noted that an overcoat film 24, which is an organic flat film for suppressing steps between the color filters 22, is disposed on the color filters and the light shielding layers 23. Further, an alignment film 25 for aligning the liquid crystal is disposed on the overcoat film 24.

The color filters 22 are configured from colored material layers obtained by dispersing pigments or the like in resin, for example, and function as filters which selectively transmit light in a specific wavelength range, such as red, green, and blue, where different color filters 22 are arranged regularly. The light shielding layers 23 are configured, for example, from a metal-based material employing chromium oxide or the like, or a resin-based material in which black particles are dispersed in a resin.

A color filter side polarizing plate 90 is disposed on the surface of the transparent substrate 21 on the opposite side to the surface that faces the array substrate.

In the liquid crystal layer 40 sandwiched between the array substrate 10 and the color filter substrate 20, liquid crystal molecules 42 are aligned in a predetermined direction (alignment direction) by the alignment films 16, 25, with a pre-tilt angle 43.

Here, the alignment direction refers to the direction in which alignment processing such as rubbing is applied to the alignment films 16, 25. Further, the pre-tilt angle refers to the angle formed by the long axis of each liquid crystal molecule 42 relative to the surface of the array substrate 10 or the color filter substrate 20 which faces the liquid crystal layer 40, when no voltage is being applied to the liquid crystal layer 40.

As illustrated in FIG. 1, the liquid crystal panel 1 is provided with a scanning signal drive circuit 61 and a display signal drive circuit 62 for controlling the TFTs 14.

Figure 4:
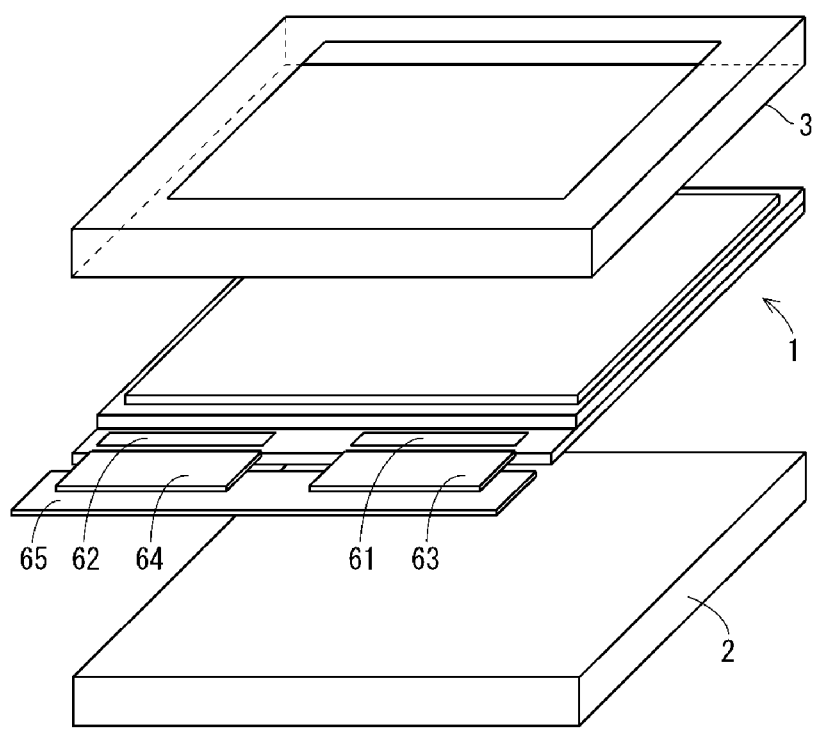
FIG. 4 is an exploded oblique view illustrating the configuration of the liquid crystal display device according to embodiment 1.

FIG. 4 is an exploded oblique view illustrating the configuration of the liquid crystal display device according to embodiment 1, provided with the liquid crystal panel 1 described hereinabove.

A plurality of pads, not shown, which are a plurality of terminals for electrically connecting the scanning signal drive circuit 61 and the display signal drive circuit 62 to a control IC chip, not shown, which controls the drive of the drive circuits, are disposed on an edge portion of the liquid crystal panel 1. The plurality of pads are electrically connected to the control IC chip, not shown, and the like, provided on a control board 65, by way of FFCs (Flexible Flat Cables) 63, 64, which are connection wiring.

Control signals from the control IC chip and the like are input to the input sides of the scanning signal drive circuit 61 and the display signal drive circuit 62 by means of the FFCs 63, 64 and the plurality of pads. Output signals output from the output sides of the scanning signal drive circuit 61 and the display signal drive circuit 62 are supplied to the TFTs 14 in the display region 50 by way of multiple signal lead-out lines, not shown, which are led out from the display region 50.

The liquid crystal display device in embodiment 1 is provided not only with the liquid crystal panel 1 described hereinabove, but also with a back-light unit 2, an optical sheet, which is not shown in the drawings, and a housing 3. The back-light unit 2 includes a lighting device such as an LED (Light Emitting Diode). The back-light unit 2 is disposed on the surface on the opposite side to a display surface of the color filter substrate 20 formed in the display region 50, with an optical sheet interposed therebetween. In other words, the back-light unit 2 is disposed in such a way as to serve as a light source facing the substrate surface of the array substrate 10. The optical sheet has the function of regulating light (back-light light) from the back-light unit 2.

The housing 3 has a shape provided with an opening that exposes the display region 50. The liquid crystal display device is configured by accommodating the liquid crystal panel 1 in the housing 3 together with optical members such as the back-light unit 2 and the optical sheet.

<Production Method>

Figure 5:
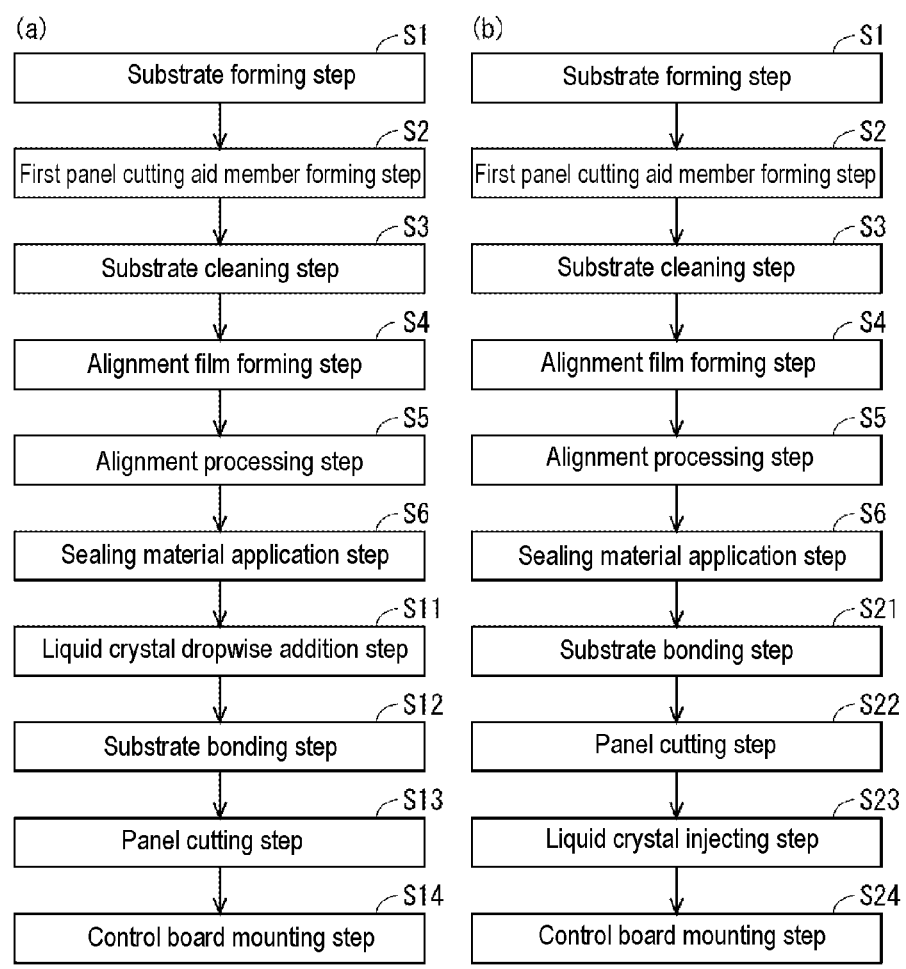
FIG. 5 is a flowchart illustrating a production method for the liquid crystal display device according to embodiment 1.

A method for producing the liquid crystal display device according to embodiment 1 will next be described. FIG. 5 (*a*) and FIG. 5 (*b*) are flowcharts illustrating the production method. FIG. 5 (*a*) illustrates a production flow employing dropwise injection, and FIG. 5 (*b*) illustrates a production flow employing vacuum injection. The liquid crystal display device according to embodiment 1 can be created using either of these production flows. It should be noted that the processes in steps S1 to S6 are the same in both the production flow in FIG. 5 (*a*) and the production flow in FIG. 5 (*b*), and the processes in steps S1 to S6 will therefore now be described collectively.

In step S1, the greater part of the array substrate 10 is produced by forming the gate electrodes, the source electrodes, the common electrodes 12, the pixel electrodes 13, the TFTs 14, and the insulating film 15 on one surface of the transparent substrate 11 by film formation or photolithography, for example. Further, the greater part of the color filter substrate 20 is produced by forming the color filters 22, the light shielding layers 23, the overcoat film 24, and the columnar spacers 41 on one surface of the transparent substrate 21. The greater part of the array substrate 10 and the greater part of the color filter substrate 20 formed in this step correspond substantially to the array substrate 10 and the color filter substrate 20. Therefore, unless otherwise noted, in the following description the greater part of the array substrate 10 and the greater part of the color filter substrate 20 formed in this step are referred to respectively as the array substrate 10 and the color filter substrate 20.

Figure 6:
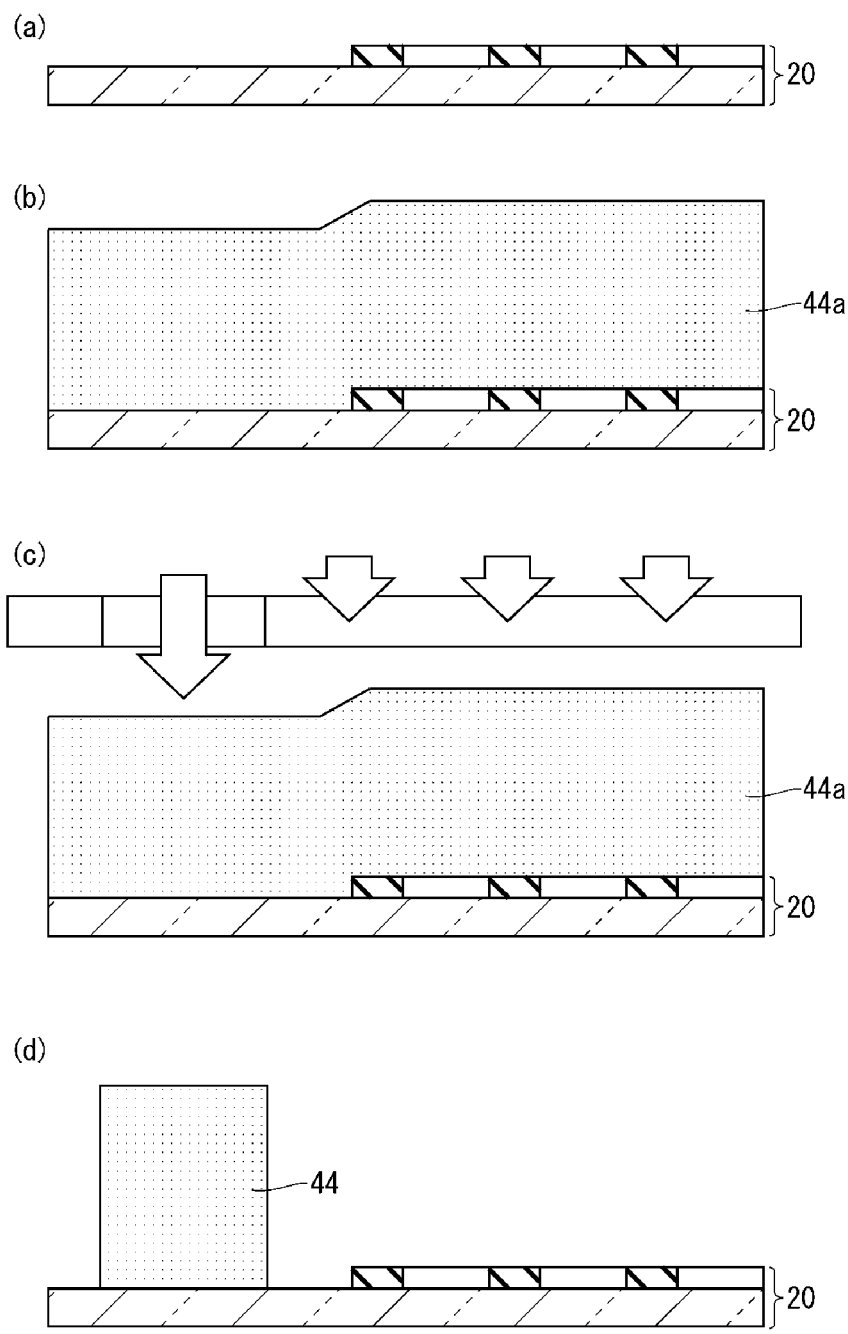
FIG. 6 is a schematic cross sectional view illustrating a method for forming a first panel cutting aid member of the liquid crystal display device according to embodiment 1.

In step S2, the first panel cutting aid members 44 are formed. For example, a photosensitive resin 44*a*, illustrated in FIG. 6 (*b*), is applied to the color filter substrate 20, illustrated in FIG. 6 (*a*). Then, as illustrated in FIG. 6 (*c*), the photosensitive resin 44*a* is exposed in such a way as to form the shape of the first panel cutting aid members 44, using a photomask, to cure the photosensitive resin 44*a*, and the first panel cutting aid members 44 are formed by means of a developing step, as illustrated in FIG. 6 (*d*).

In step S3, the array substrate 10 and the color filter substrate 20 are cleaned.

In step S4, an organic film comprising a polyamide, serving as an alignment film material, is applied to the color filter substrate 20 by means of a printing method or the like, and is dried by means of a baking process employing a hotplate or the like, to form the alignment film 25. The alignment film 16 is formed on the array substrate 10 in the same way as on the color filter substrate 20.

It should be noted that in the above description, the first panel cutting aid members 44 are formed on the color filter substrate 20, but the same may be formed on the array substrate 10. Further, the first panel cutting aid members 44 and the columnar spacers 41 may be fabricated at the same time using the same material. Further, the material of the first panel cutting aid members 44 is not limited to a photosensitive resin.

In step S5, the alignment films 16, 25 of the array substrate 10 and the color filter substrate 20 are subjected to alignment processing. The alignment processing includes, for example, a rubbing step of directly rubbing the alignment film using a cloth, or an optical alignment step employing radiation with polarized UV (ultraviolet) light.

In step S6, the annular sealing material 30, including linear portions extending in the short-side direction and the long-side direction of the liquid crystal panel 1, and corner portions connecting the same, is applied to either the array substrate 10 or the color filter substrate 20 by rendering using a dispenser, or by screen printing. It should be noted that the substrate on which the sealing material 30 is applied and formed may be the same as or different from the substrate on which the first panel cutting aid members 44 are formed. Further, the shape of the corner portions of the sealing material 30 in a plan view may be arc-shaped, or may be another curved shape.

The subsequent steps differ between the production flow in FIG. 5 (*a*), which includes a step of forming the liquid crystal layer 40 by dropwise injection, and the production flow in FIG. 5 (*b*), which includes a step of forming the liquid crystal layer 40 by vacuum injection, and will therefore described separately below.

<Production Flow Including Dropwise Injection>

In step S11, liquid crystal, which will become the liquid crystal layer 40, is added dropwise onto the substrate on which the sealing material 30 has been formed, among the array substrate 10 and the color filter substrate 20. In step S12, the array substrate 10 and the color filter substrate 20 are bonded to one another. At this point in time, a structure in which a plurality of partial structures have been integrated is formed. The partial structures referred to here each include the array substrate 10 including the transparent substrate 11, the color filter substrate 20 including the transparent substrate 21, the sealing material 30, the liquid crystal layer 40, and the first panel cutting aid members 44. In other words, each of the plurality of partial structures is substantially the same as the liquid crystal panel 1.

In step S13, the partial structures are cut out from the structure by cutting along cutting lines that pass through the sealing material 30 and the first panel cutting aid members 44. In other words, the liquid crystal panel 1 is cut out by cutting the substrates after bonding, along cutting lines in the size of the liquid crystal panel 1.

In step S14, the scanning signal drive circuit 61 and the display signal drive circuit 62 are mounted on the frame region 60 of the liquid crystal panel 1, and the control board 65 is connected by way of the FFCs 63, 64.

<Production Flow Including Vacuum Injection>

In step S21, the array substrate 10 and the color filter substrate 20 are bonded to one another. At this point in time, a structure in which a plurality of partial structures have been integrated is formed. Each of the plurality of partial structures referred to here includes the array substrate 10 including the transparent substrate 11, the color filter substrate 20 including the transparent substrate 21, the sealing material 30, and the first panel cutting aid members 44. In other words, each of the plurality of partial structures is substantially the same as the liquid crystal panel 1 without the liquid crystal layer 40.

In step S22, the partial structures are cut out from the structure by cutting along cutting lines that pass through the sealing material 30 and the first panel cutting aid members 44. In other words, the liquid crystal panel 1 without the liquid crystal layer 40 is cut out by cutting the substrates after bonding, along cutting lines in the size of the liquid crystal panel 1.

In step S23, the liquid crystal panel 1 without the liquid crystal layer 40 is placed in a location under a vacuum, and the liquid crystal layer 40 is formed by injecting liquid crystal into the liquid crystal panel 1 without the liquid crystal layer 40. In step S24, the scanning signal drive circuit 61 and the display signal drive circuit 62 are mounted on the frame region 60 of the liquid crystal panel 1, and the control board 65 is connected by way of the FFCs 63, 64.

<Regarding First Panel Cutting Aid Members>

Figure 7:
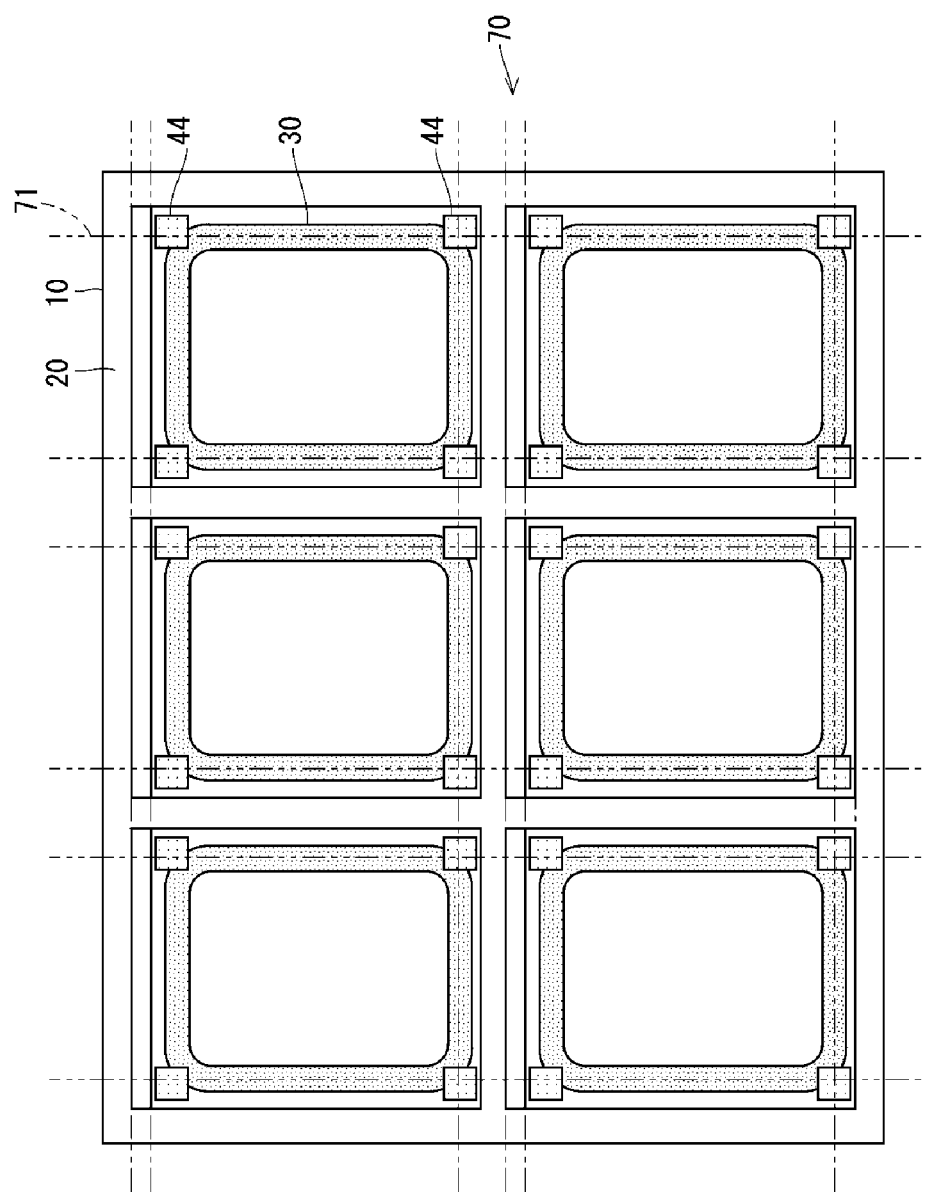
FIG. 7 is a schematic plan view used to describe cutting of the liquid crystal display device according to embodiment 1.

The first panel cutting aid members 44 will now be described in detail. FIG. 7 is a schematic plan view illustrating a structure 70 before cutting, in which a plurality of partial structures are integrated.

The first panel cutting aid members 44 before cutting are embedded into the corner portions of the sealing material 30, and protrude from outer peripheral portions of the sealing material 30. In embodiment 1, the first panel cutting aid members 44 extend from the corner portions on the trajectory of the sealing material 30 to the outside of the sealing material 30.

It should be noted that during the substrate bonding step after the sealing material 30 has been applied to and formed on either the array substrate 10 or the color filter substrate 20, the sealing material is pressure bonded to the substrates, thereby becoming a desired region that has expanded slightly from the application region. The trajectory of the sealing material 30 corresponds to the region of the sealing material 30 after the substrate bonding step. Therefore, the first panel cutting aid members 44 are formed in positions on either the array substrate 10 or the color filter substrate 20 so as to come into contact with the outer peripheral portions of the corner portions of the sealing material 30 that expands slightly during the substrate bonding step.

The first panel cutting aid members 44 are disposed in the corner portions of the sealing material 30 in such a way as to fill the space between the array substrate 10 and the color filter substrate 20, and have the same height as the cell gap of the liquid crystal panel 1.

Cutting lines 71, illustrated by the two-dash chain lines, pass through the sealing material 30 and the first panel cutting aid members 44, and cutting is performed along the cutting lines 71. It should be noted that in FIG. 7, two cutting lines 71 that pass through the upper sides of each of the plurality of partial structures are illustrated. Among these two cutting lines 71, the array substrate 10 and the color filter substrate 20 are cut along the upper cutting line 71, and the color filter substrate 20 is cut along the lower cutting line 71, without cutting the array substrate 10.

Figure 8:
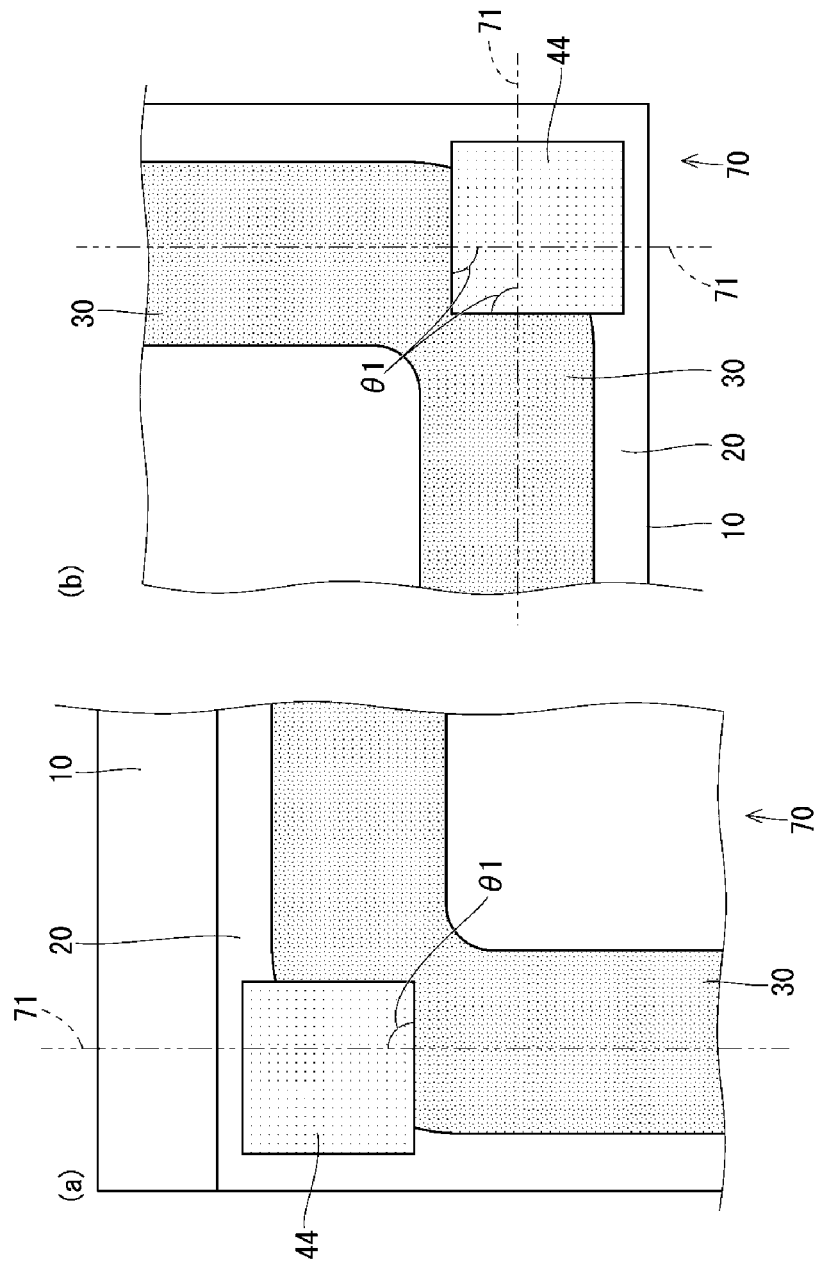
FIG. 8 is an enlarged plan view used to describe cutting of the liquid crystal display device according to embodiment 1.

FIG. 8 (a) and FIG. 8 (b) are enlarged plan views illustrating the corner portions in the structure before cutting. The positions of the first panel cutting aid members 44 and the cutting lines 71 are designed such that, in a plan view, an angle θ1 between a side of the first panel cutting aid member 44 formed by the cutting, and a boundary line that is in contact with said side, among boundary lines of the sealing material 30 and the first panel cutting aid member 44, is at most equal to 90°. As a result, in a plan view after cutting, the angle θ1 between the side that is included in the edge of the liquid crystal panel 1, among the sides of the first panel cutting aid member 44, and the boundary line that is in contact with said side, among the boundary lines of the sealing material 30 and the first panel cutting aid member 44, is at most equal to 90°. It should be noted that the shape of the part of the sealing material 30 that intersects the cutting line 71 is the same as the shape of the first panel cutting aid member 44.

<Summary of Embodiment 1>

According to the liquid crystal display device according to embodiment 1 described hereinabove, and the method for producing the same, the first panel cutting aid members 44 are cut before and after the sealing material 30 of the structure 70 is cut. At this time, the shapes of the parts of the sealing material 30 that intersect the cutting lines 71 are controlled by the shape of the first panel cutting aid members 44. It is therefore possible to suppress cutting of parts that have low left-right symmetry with respect to the cutting lines 71, such as arc-shaped corner portions of the sealing material 30. This makes it possible to suppress stress imbalances that arise when parts having low left-right symmetry with respect to the cutting lines 71 are cut, and cutting failures resulting from such stress imbalances can therefore be suppressed.

Further, by arranging that the first panel cutting aid members 44 before cutting protrude from the outer peripheral portions of the sealing material 30, deflection of the array substrate 10 and the color filter substrate 20 that occurs outside the outer peripheral portions of the sealing material 30 can be suppressed. The effect of suppressing stress imbalances described hereinabove can thus be enhanced.

Modified Examples of Embodiment 1

Figure 9:
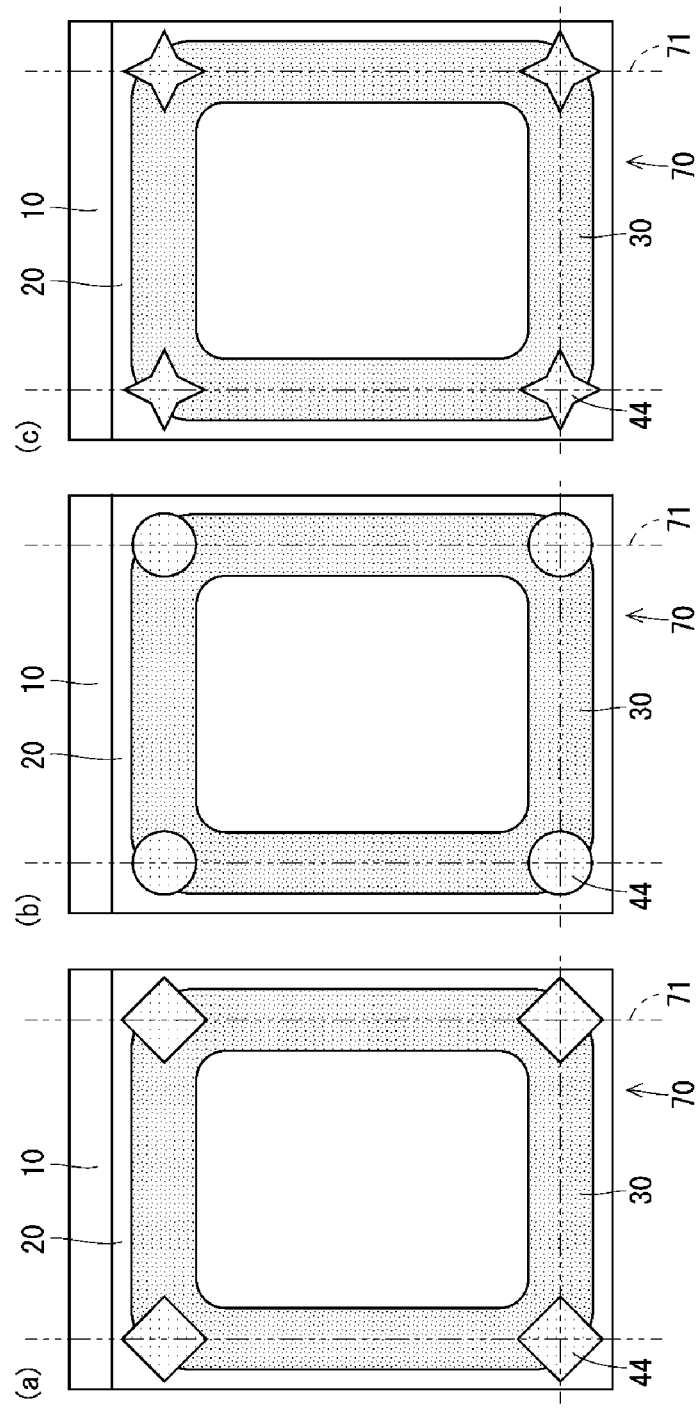
FIG. 9 is a schematic plan view used to describe cutting of a liquid crystal display device according to modified examples of embodiment 1.

In the abovementioned description, the shape of the first panel cutting aid members 44 in a plan view is a quadrangular shape having sides that are substantially parallel to the cutting lines 71 and sides that are substantially perpendicular thereto, but the shape is not limited to this shape. The shape of the first panel cutting aid members 44 in a plan view should be a shape having high left-right symmetry with respect to the cutting lines 71, such as the rhombic shape illustrated in FIG. 9 (a), the circular shape illustrated in FIG. 9 (b), or the star shape illustrated in FIG. 9 (c), for example. Here, with the rhombic shape illustrated in FIG. 9 (a) and the start shape illustrated in FIG. 9 (c), the shape should be arranged such that the angle θ1 between a side formed by cutting the first panel cutting aid member 44 and the boundary line that is in contact with said side, among the boundary lines of the sealing material 30 and the first panel cutting aid member 44, is at most equal to 90°. In contrast, with the circular shape illustrated in FIG. 9 (b), the shape should be arranged such that the angle θ1 between a side formed by cutting the first panel cutting aid member 44 and a boundary line that is in contact with said side and with a tangent of which the point of contact is a boundary portion of the sealing material 30 and the first panel cutting aid member 44 is at most equal to 90°. In other words, the shape of the first panel cutting aid members 44 in a plan view should be a shape with which an imbalance of stresses applied to the array substrate 10 and the color filter substrate 20 in the parts of the sealing material 30 that intersect the cutting lines 71 is not liable to occur.

Further, in the abovementioned description, four first panel cutting aid members 44 are embedded respectively in the four corners, but the arrangement is not limited to this, and it is sufficient for one or more first panel cutting aid members 44 to be embedded in one or more corner portions. In the configurations illustrated in FIG. 10 (a), FIG. 10 (b), and FIG. 10 (c), at least two first panel cutting aid members 44 are embedded in at least two corner portions.

Figure 10:
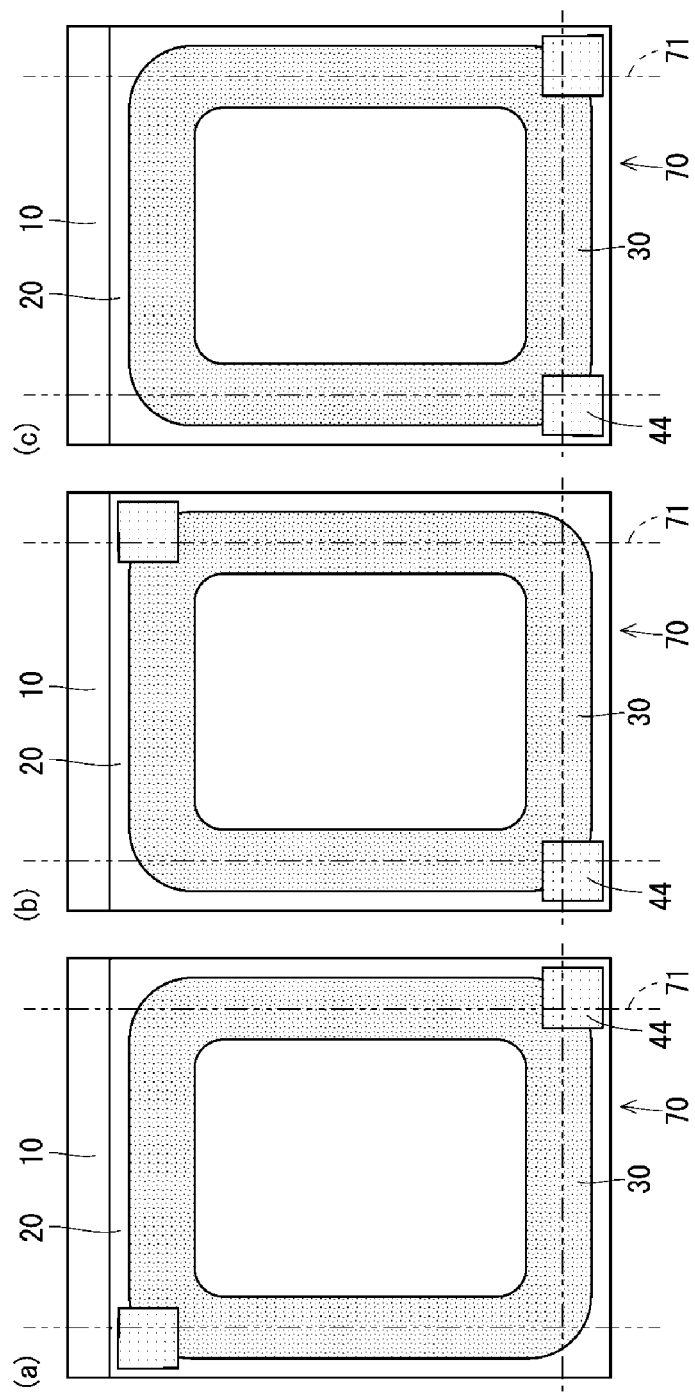
FIG. 10 is a schematic plan view used to describe cutting of a liquid crystal display device according to modified examples of embodiment 1.

With the configuration in FIG. 10 (a), cutting progresses downward from the upper left first panel cutting aid member 44, and cutting progresses upward and toward the left from the lower right first panel cutting aid member 44. With the configuration in Figure (b), cutting progresses downward from the upper right first panel cutting aid member 44, and cutting progresses upward and toward the right from the lower left first panel cutting aid member 44. With the configuration in FIG. 10 (c), cutting progresses upward from the lower left first panel cutting aid member 44, cutting progresses upward from the lower right first panel cutting aid member 44, and cutting progresses either toward the right from the lower left first panel cutting aid member 44 or toward the left from the lower right first panel cutting aid member 44.

In this way, by adopting a configuration in which at least two first panel cutting aid members 44 are embedded in at least two corner portions, it is possible for the first panel cutting aid member 44 to be cut before the sealing material 30 is cut, for all cutting of the sealing material 30. It is thus possible to obtain the effect of suppressing stress imbalance using a small number of first panel cutting aid members 44.

Embodiment 2

Figure 11:
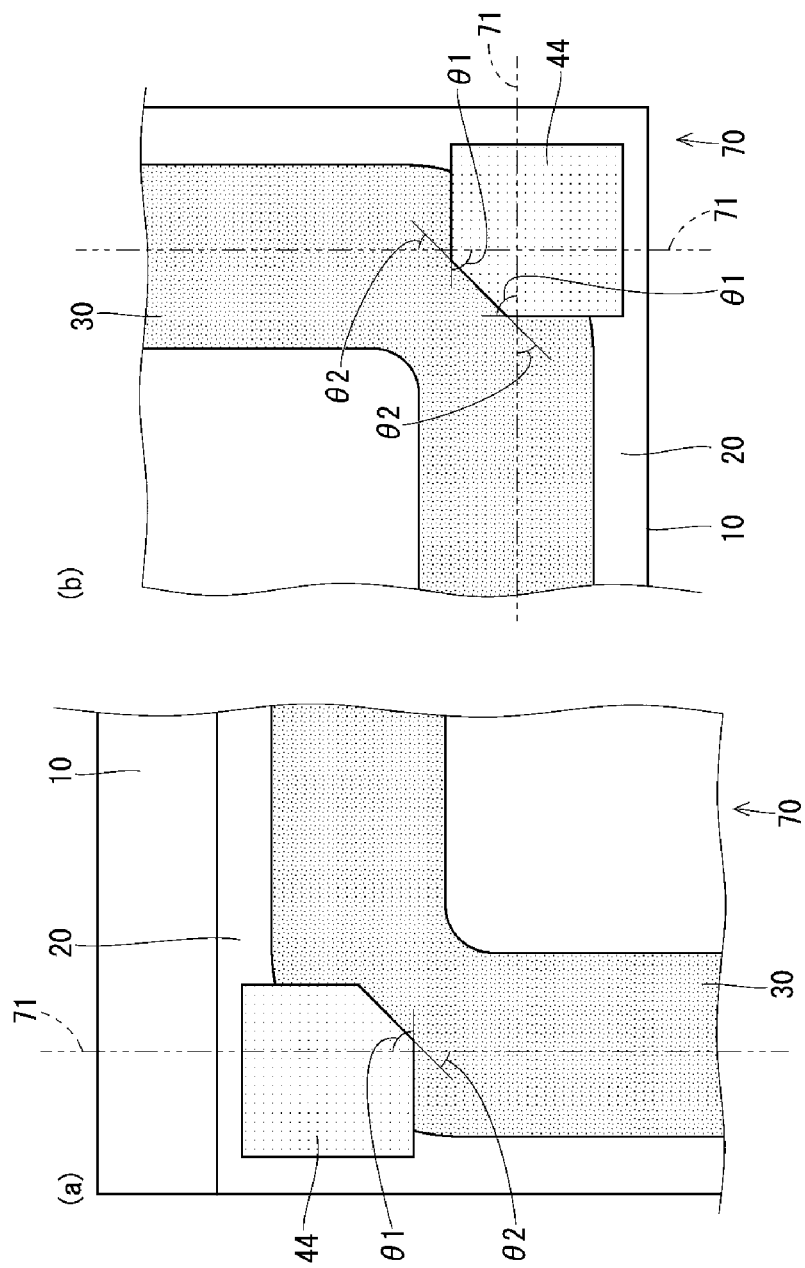
FIG. 11 is an enlarged plan view used to describe cutting of a liquid crystal display device according to embodiment 2.

FIG. 11 (a) and FIG. 11 (b) are enlarged plan views illustrating corner portions in the structure 70 of a liquid crystal display device according to embodiment 2 of the present invention. The liquid crystal panel 1 according to embodiment 2 is the same as the liquid crystal panel 1 according to embodiment 1, except that the shape of the first panel cutting aid members 44 differs from the shape of the first panel cutting aid members 44 according to embodiment 1.

The shape of the first panel cutting aid members 44 in embodiment 2 is a pentagonal shape in which the apex positioned closest to the display region 50 has been cut off a quadrangle shaped as in embodiment 1, more specifically a quadrangle having sides that are substantially parallel to the cutting lines 71 and sides that are substantially perpendicular thereto. In other words, the shape of the first panel cutting aid members 44 has a side which is not parallel to the cutting lines 71 and which faces the display region 50, where said side is connected to the sides that are perpendicular to the cutting lines 71. The width of the sealing material 30 in the corner portions of the liquid crystal panel 1 is thus increased.

In the same way as in embodiment 1, in embodiment 2 the angle θ1 between a side formed by cutting the first panel cutting aid member 44 and the boundary line that is in contact with said side, among the boundary lines of the sealing material 30 and the first panel cutting aid member 44, is at most equal to 90°.

In addition, in embodiment 2, the first panel cutting aid member 44 has, in a plan view, a specific side formed by cutting the first panel cutting aid member 44, and a side that is not parallel to the specific side and that faces the display region 50. In a plan view, an angle θ2 between the specific side formed by cutting the first panel cutting aid member 44, and a tangent to the side that is not parallel to the specific side and that faces the display region, is at most equal to 90°. As a result, in a plan view after cutting, the angle θ2 between the specific side that is included in the liquid crystal panel 1, among the sides of the first panel cutting aid member 44, and the tangent to the side that is not parallel to the specific side and that faces the display region, is at most equal to 90°. In other words, one end part that is in contact with the sealing material 30, among the two end parts of the first panel cutting aid member 44 in the direction along the edge of the liquid crystal panel 1, has a substantially tapered shape.

By adopting the liquid crystal display device according to embodiment 2 configured in this way, and the method for producing the same, the width of the sealing material 30 in the four corner portions of the liquid crystal panel 1 can be increased in comparison with embodiment 1. Therefore, in addition to the effects obtained with embodiment 1, it is also possible to improve the strength of adhesion between the array substrate 10 and the color filter substrate 20 of the liquid crystal panel 1.

Modified Examples of Embodiment 2

Figure 12:
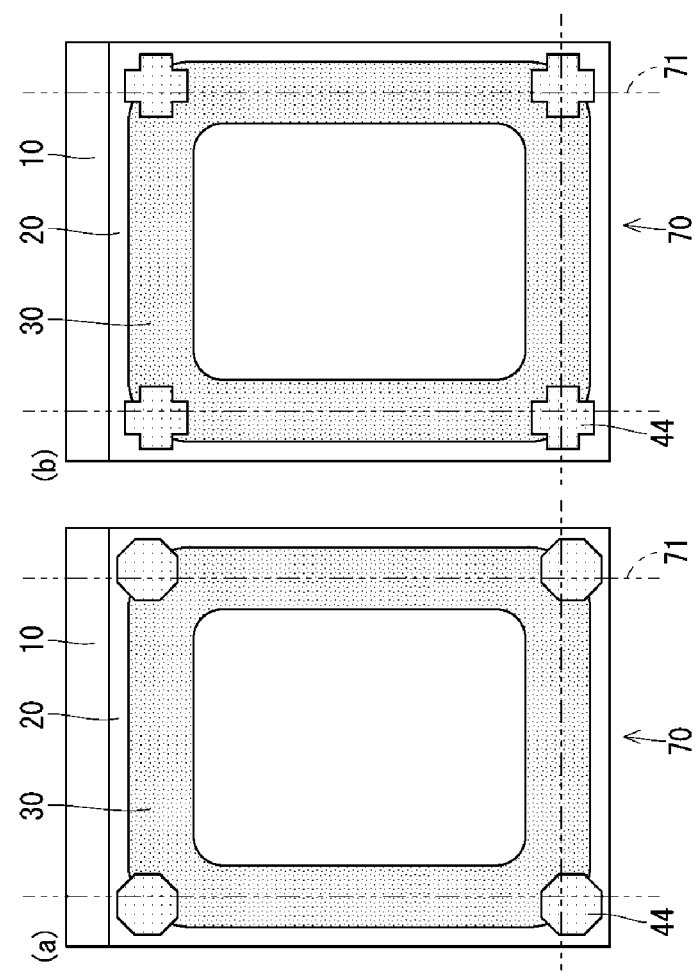
FIG. 12 is a schematic plan view used to describe cutting of a liquid crystal display device according to modified examples of embodiment 2.

In the abovementioned description, the shape of the first panel cutting aid members 44 in a plan view was a substantially pentagonal shape obtained by shaving off one apex of a quadrangular shape, but the shape is not limited to this shape. For example, the shape of the first panel cutting aid members 44 in a plan view may be the octagonal shape illustrated in FIG. 12 (*a*), or may be the cross shape illustrated in FIG. 12 (*b*). In other words, the shape of the first panel cutting aid members 44 in a plan view should be a shape with which an imbalance of stresses applied to the array substrate 10 and the color filter substrate in the parts of the sealing material 30 that intersect the cutting lines 71 is not liable to occur, and should be configured to increase the width of the sealing material 30 in the four corner portions of the liquid crystal panel 1. It should be noted that, without limitation to the cross shape illustrated in FIG. 12 (*b*), the configuration may be such that the width of the sealing material 30 is increased only in the region of the first panel cutting aid member 44 that faces the display region 50.

Embodiment 3

Figure 13:
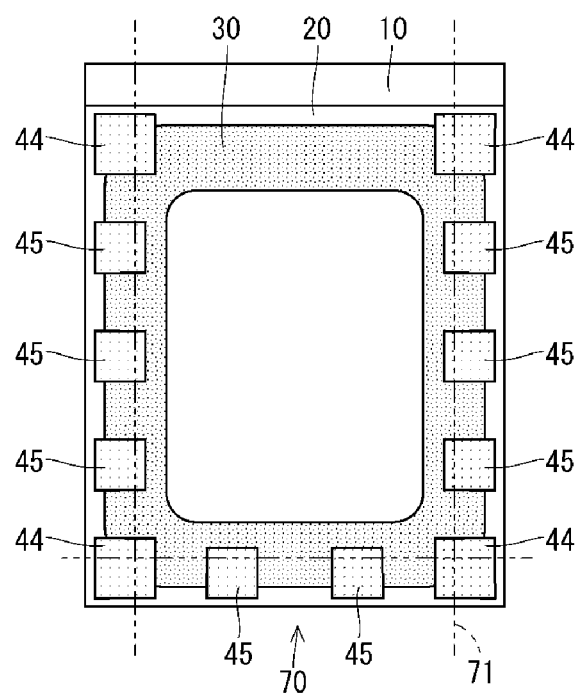
FIG. 13 is a schematic plan view used to describe cutting of a liquid crystal display device according to embodiment 3.

FIG. 13 is a schematic plan view illustrating the configuration of the structure 70 in a liquid crystal display device according to embodiment 3 of the present invention. The liquid crystal panel 1 according to embodiment 3 is the same as the liquid crystal panel 1 according to embodiment 1, except of the addition of second panel cutting aid members 45. It should be noted that in the plan view in FIG. 13, the second panel cutting aid members 45 are positioned on the rear side of the color filter substrate 20, and should thus be illustrated using hidden lines (dashed lines), but for convenience are illustrated as solid lines in the plan view in FIG. 13.

As illustrated in FIG. 13, the sealing material 30 has four sides in a plan view (a plurality of sides, where the number of sides is at least equal to three).

The second panel cutting aid members 45 are members which are embedded in a plurality of sides of the sealing material 30, excluding one side, and which have a lower hardness than the sealing material 30. In the example in FIG. 13, one side of the sealing material 30 is the side on which the plurality of pads that are connected to the FFCs 63, 64 are provided, and the second panel cutting aid members 45 are embedded in the remaining three sides, other than said one side. The second panel cutting aid members 45 have the same height as the gap between the transparent substrate 11 and the transparent substrate 21, as is the case with the first panel cutting aid members 44. Further, the second panel cutting aid members 45 before cutting protrude from outer peripheral portions of the sealing material 30. It should be noted that the method for forming the second panel cutting aid members 45 is the same as the method for forming the first panel cutting aid members 44.

In embodiment 3, the partial structures are cut out from the structure 70 by cutting not only along cutting lines that pass through the sealing material 30 and the first panel cutting aid members 44, but also by cutting along cutting lines 71 that pass through the sealing material 30 and the second panel cutting aid members 45. After cutting, the second panel cutting aid members 45 have a surface which is exposed from the outer circumferential portion of the sealing material 30.

According to the liquid crystal display device according to embodiment 3 configured in this way, and the method for producing the same, along the cutting lines 71, regions provided with the second panel cutting aid members 45, which have a lower hardness than the sealing material 30, are added to the region in which the array substrate 10 and the color filter substrate 20 are adhered by means of the sealing material 30. It is therefore easy to cut along the cutting lines 71, and consequently cracking and chipping of the array substrate 10 and the color filter substrate 20 can be suppressed. It should be noted that the first panel cutting aid members 44 may also have a lower hardness than the sealing material 30.

It should be noted that, in the present invention, each embodiment and each modified example can be freely combined, and each embodiment and each modified example can be modified and omitted as appropriate, within the scope of the present invention.

Although the present invention has been described in detail, the abovementioned description is exemplary in all aspects, and the present invention is not limited thereto. It is to be understood that innumerable modified examples that have not been illustrated can be assumed without deviating from the scope of the present invention.

EXPLANATION OF THE REFERENCE SIGNS

1 liquid crystal panel, 11, 21 transparent substrate, 30 sealing material, 40 liquid crystal layer, 44 first panel cutting aid member, 45 second panel cutting aid member, 50 display region, 70 structure, 71 cutting line.

The invention claimed is:

1. A liquid crystal display: comprising,
a first substrate,
a second substrate, a liquid crystal layer sandwiched between the first substrate and the second substrate, a sealing material sealing the liquid crystal layer between the first substrate and the second substrate, the sealing material including a line portion and a corner portion in a plan view, and a first material disposed in the corner portion of the sealing material, wherein an outer edge of a part of the line portion substantially coincides with an edge of the first substrate or an edge of the second substrate, a thickness of the first material is substantially equal to a gap distance that is a distance between the first substrate and the second substrate, the first material is in contact with the sealing material, and an outer edge of the first material substantially coincides with the edge of the first substrate or the edge of the second substrate.

2. A liquid crystal display according to claim 1, wherein the sealing material includes a plurality of the corner portions, at least two of the plurality of the corner portions have the first material disposed respectively.

3. A liquid crystal display according to claim 1, one edge of the first material, which is different from the outer edge of the first material, and an extension direction of the line portion cross each other, forming an inner angle, which is in an inner side of the first material, wherein, the inner angle is equal to or less than 90 degrees.

4. A liquid crystal display according to claim 1, wherein the line portion includes a first line portion extending along a first direction and a second line portion extending along a second direction that is different from the first direction, the first material is disposed at a point where the first line portion and the second line portion cross each other, one edge of the first material, which is different from the outer edge of the first material, crosses the first direction to form a first acute angle and crosses the second direction to form a second acute angle.

5. A liquid crystal display according to claim 1, further comprising, a second material disposed in the line portion, wherein the second material is as hard as or softer than the sealing material, a thickness of the second material is substantially equal to the gap distance between the first substrate and the second substrate, and an outer edge of the second material substantially coincides with the edge of the first substrate or the edge of the second substrate.

6. A fabrication method of a liquid crystal display, comprising, preparing a mother substrate including a plurality of devices, each of the plurality of devices comprising, a first substrate,
a second substrate,
a sealing material sealing a liquid crystal layer between the first substrate and the second substrate, the sealing material including a line portion and a corner portion in a plan view, and a first material disposed in the corner portion of the sealing material, wherein a thickness of the first material is substantially equal to a gap distance that is a distance between the first substrate and the second substrate, the first material protrudes outward from an outer edge of the sealing material, and the fabrication method comprises a process of cutting out each device from the mother substrate along a first cut line passing through the sealing material and the first material.

7. A fabrication method of a liquid crystal display according to claim 6, each of the plurality of devices further comprises a second material disposed in the respective line portion, wherein, the second material is as hard as or softer than the sealing material, a thickness of the second material is substantially equal to the gap distance between the first substrate and the second substrate, the second material protrudes outward from the outer edge of the sealing material, and the fabrication method comprises a process of cutting out each device from the mother substrate along a second cut line passing through the sealing material and the second material.

8. A liquid crystal display: comprising, a first substrate, a second substrate, a liquid crystal layer sandwiched between the first substrate and the second substrate, and a sealing material sealing the liquid crystal layer between the first substrate and the second substrate, wherein the sealing material includes a first line portion and a corner portion in plan view, an outer edge of the first line portion substantially coincides with an edge of the first substrate or an edge of the second substrate, and an outer edge of the corner portion is formed inside the edge of the first substrate and the edge of the second substrate in the plan view.

9. A liquid crystal display according to claim 8, the sealing material includes a plurality of the corner portions, of the corner portions, at least two of the plurality of the corner portions have an outer edge that is formed inside the edge of the first substrate and the edge of the second substrate in the plan view.

10. A liquid crystal display according to claim 8, an outer angle between the outer edge of the first line portion and the outer edge of the corner portion is equal to or less than 90 degrees.

11. A liquid crystal display according to claim 8, wherein the sealing material further includes a second line portion, and an outer edge of the second line portion is formed inside the edge of the first substrate and the edge of the second substrate in the plan view.

* * * * *